United States Patent
Dick et al.

(10) Patent No.: US 12,428,097 B2
(45) Date of Patent: Sep. 30, 2025

(54) HANDLEBAR RISERS

(71) Applicant: Arctic Cat Inc., Thief River Falls, MN (US)

(72) Inventors: Brian W. Dick, Thief River Falls, MN (US); Benjamin Taylor Langaas, Thief River Falls, MN (US); Ken Ray Fredrickson, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 854 days.

(21) Appl. No.: 17/575,868

(22) Filed: Jan. 14, 2022

(65) Prior Publication Data

US 2022/0227448 A1 Jul. 21, 2022

Related U.S. Application Data

(60) Provisional application No. 63/138,043, filed on Jan. 15, 2021.

(51) Int. Cl.
*B62K 21/12* (2006.01)
*B62J 11/10* (2020.01)
(Continued)

(52) U.S. Cl.
CPC ............... *B62K 21/16* (2013.01); *B62J 11/13* (2020.02); *B62J 11/16* (2020.02)

(58) Field of Classification Search
CPC ...... B62K 21/125; B62K 21/16; B62K 21/18; B62K 21/22; B62K 21/24; B62J 11/13; B62J 11/16
See application file for complete search history.

(56) References Cited

U.S. PATENT DOCUMENTS 5,133,568 A * 7/1992 Balterman ........... B62K 21/125
 74/551.8
5,921,145 A * 7/1999 Muser ................... B62K 21/14
 74/551.2

(Continued)

FOREIGN PATENT DOCUMENTS

GB 2445931 A * 7/2008 ............. B62K 21/16
JP 2010154841 A * 7/2010 ............. A01D 34/90

OTHER PUBLICATIONS

2008 Sea-Doo RXP X 255 Steering; https://www.seadoopartshouse.com/oemparts/a/sea/500d6508f870020908257a21/steering (Year: 2008).*

(Continued)

*Primary Examiner* — Adam D Rogers
(74) *Attorney, Agent, or Firm* — Billion & Armitage

(57) ABSTRACT

This disclosure is directed to devices and techniques for improved handlebar risers. According to various aspects of this disclosure, a handlebar riser includes a first component and a second component. The first component includes a first steering column mounting channel, and a first handlebar mounting channel. The second component includes a second steering column mounting channel, and a second handlebar mounting channel. The first component and second component are sized, shaped, and arranged such that when respective abutment surfaces of the first and second components are placed together, the first and second steering column mounting channel form a first channel that substantially surrounds at least part of a vehicle steering column, and the first and second handlebar mounting channel forms a second channel that substantially surrounds at least part of a vehicle handlebar. The first and second components are mechanically coupleable to one another.

18 Claims, 12 Drawing Sheets

(51) Int. Cl.
*B62J 11/13* (2020.01)
*B62J 11/16* (2020.01)
*B62K 21/16* (2006.01)

(56) References Cited

U.S. PATENT DOCUMENTS

| | | | | |
|---|---|---|---|---|
| 6,343,891 | B1* | 2/2002 | Combs | F16B 7/0493 403/385 |
| 7,568,733 | B2* | 8/2009 | Bowers | B62K 21/16 280/775 |
| 7,685,904 | B2* | 3/2010 | Cutsforth | B62K 21/16 74/551.3 |
| 8,029,011 | B2* | 10/2011 | King | B62K 21/16 74/551.8 |
| 9,919,726 | B2* | 3/2018 | Labbe | B62D 1/185 |
| 10,808,741 | B2* | 10/2020 | Ahnert | B25B 5/08 |
| 2006/0102807 | A1* | 5/2006 | Chen | B62J 11/13 248/65 |
| 2008/0202281 | A1* | 8/2008 | Bruyere | B62K 21/125 74/551.8 |
| 2024/0083490 | A1* | 3/2024 | Olin | B62K 21/18 |
| 2024/0083545 | A1* | 3/2024 | Vigen | B62M 27/02 |

OTHER PUBLICATIONS

Machine translation of JP 2010154841 A obtained on Oct. 24, 2024.*

Plueddeman, Charles, "Sea-Doo RXT-X and RXP-X PWC reviews", boats.com, retrieved Jun. 13, 2018 from http://www.boats.com/reviews/sea-doo-rxt-x-rxp-x-personal-watercraft-review/, Jan. 3, 2008.

* cited by examiner

HANDLEBAR RISERS

This application claims benefit of U.S. Provisional Application No. 63/138,043, filed on Jan. 15, 2021 and which application is incorporated herein by reference. A claim of priority is made.

BACKGROUND

Recreational vehicles, such as snowmobiles, all-terrain vehicles (ATV), motorcycles, mopeds, and the like are popular vehicles. In some examples, such vehicles are designed to be steered by a handlebar coupled to a steering mechanism of the vehicle, for example one or more skis in the case of a snowmobile, or one or more wheels of an ATV, motorcycle, or moped.

In some examples, it may be desirable for a vehicle to include a handlebar riser that mechanically couples the vehicle handlebar to a steering shaft of the vehicle. In some examples, a handlebar riser may be included in a vehicle as designed by a manufacturer, in other examples a handlebar riser may be added to an existing vehicle to fit the handlebar height to the particular requirements of a rider.

SUMMARY

Embodiments describe a handlebar riser for use in a vehicle, including a first component comprising a first steering column mounting channel for receiving at least a part of a steering column coupled to the vehicle, and a first handlebar mounting channel for receiving at least part of a handlebar of the vehicle, a second component symmetrical to the first component, the second component comprising a second steering column mounting channel corresponding to the first steering column mounting channel of the first component and a second handlebar mounting channel corresponding to the first handlebar mounting channel. The first component and the second component are sized, shaped and arranged such that when an abutment surface of the first component and an abutment surface of the second component are placed in alignment with one another, the first and second steering column mounting channels form a first channel surrounding at least part of the steering column, and the first handlebar mounting channel and the second handlebar mounting channel form a second channel surrounding at least part of the handlebar, such that when the first component and the second component are mechanically coupled together, the handlebar is secured to the handlebar riser and the steering column is secured to the handlebar riser so that the vehicle is steerable using the handlebar.

Embodiments also describe a method of coupling a steering column to a handlebar using a riser assembly. The method includes placing at least a part of a steering column in a first steering column mounting channel of a first component of the riser assembly, and placing at least a part of a handlebar in a first handlebar mounting channel of the first component, arranging a second component of the riser assembly in contact with the first portion such that the at least a part of the steering column is arranged in a second steering column mounting channel of the second component of the riser assembly, and at least a part of the handlebar is arranged in a second handlebar mounting channel of the second component, and mechanically securing the first component to the second component, thereby securing the handlebar to the riser assembly, and the steering column to the riser assembly.

Also described herein are embodiments to a handlebar riser assembly including a first component comprising first means for receiving at least part of a steering column and first means for receiving at least part of a handlebar, a second component comprising a second means for receiving the at least part of the steering column and a second means for receiving the at least part of the handlebar. The first component and the second component are sized, shaped and arranged such that when an abutment surface of the first component and an abutment surface of the second component are placed in alignment with one another, the first and second steering column means form a first channel means surrounding at least part of the steering column, and the first and second handlebar means form a second channel means surrounding at least part of the handlebar, such that when the first component and the second component are mechanically coupled together, the handlebar is secured to the handlebar riser assembly and the steering column is secured to the handlebar riser so that a vehicle comprising the handlebar riser assembly is steerable using the handlebar.

DETAILED DESCRIPTION

Handlebar risers may be used to couple together one or more portions of a steering mechanism, for example a handlebar or handlebars, and a steering shaft. Typical handlebar risers suffer from several deficiencies. For example, typical handlebar risers may be difficult or expensive to manufacture, have limited interchangeable parts, and may not sufficiently dampen vibrations, causing operator fatigue.

Figure 1A:
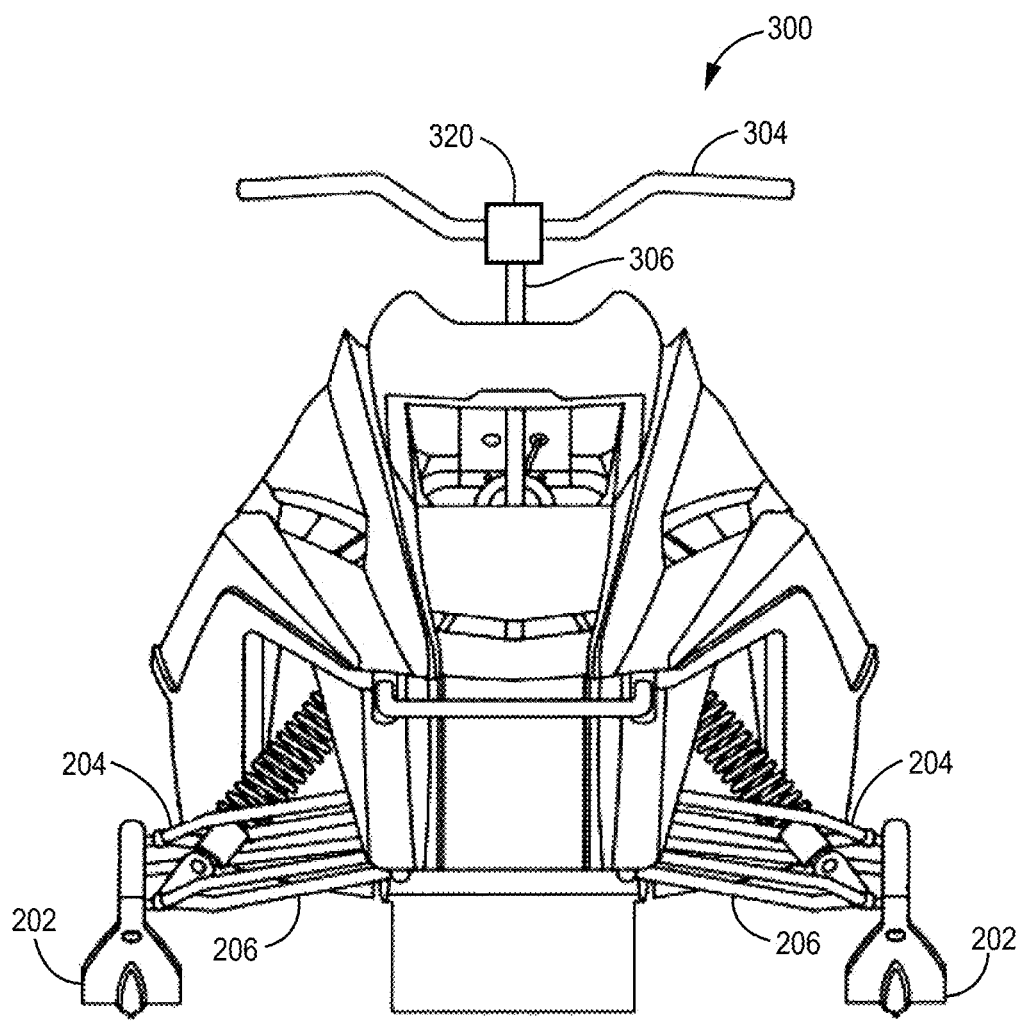
FIGS. 1A and 1B are perspective front and side views, respectively, of a snowmobile that includes a handlebar riser, according to some embodiments.
Figure 1B:
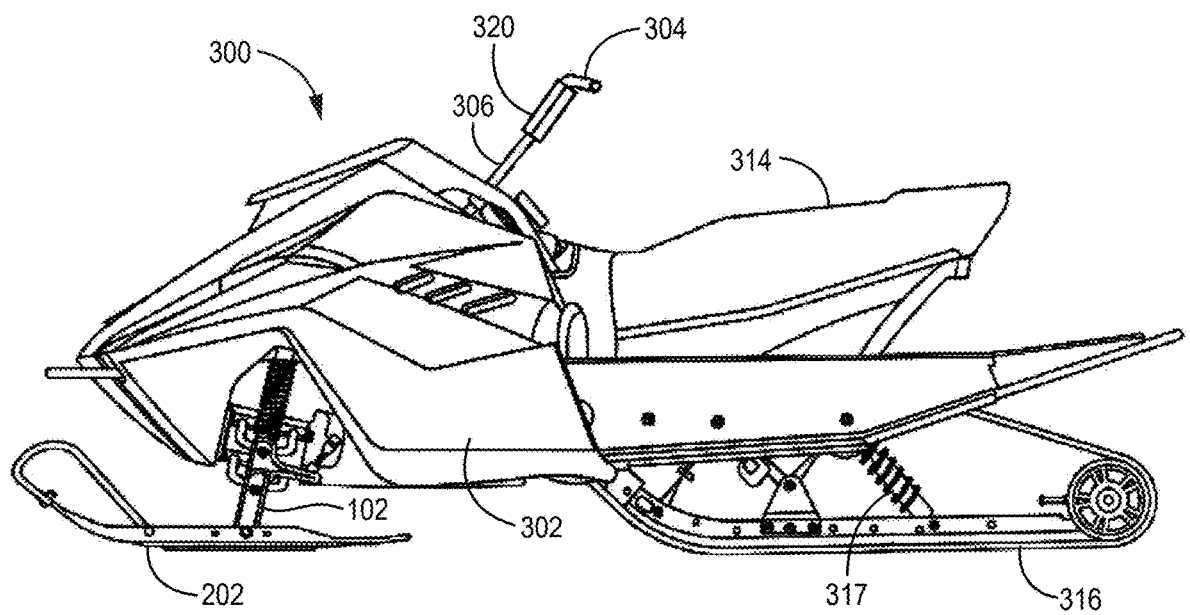

FIGS. 1A and 1B depict a vehicle 300 that includes a handlebar 304 mechanically coupled to a steering shaft 306 of the vehicle using a handlebar riser 320 consistent with one or more aspects of this disclosure. As depicted in FIG. 1A, vehicle 300 is a snowmobile. While this disclosure describes a handlebar riser 320 that may be used in conjunction with the handlebar 304 of a snowmobile, one of ordinary skill in the art will understand that the handlebar riser 320 described herein may be used with any type of vehicle that includes a handlebar 320 that are used to steer the vehicle, such as an all-terrain vehicle (ATV), motorcycle, moped, snow-bike, or other straddle-type vehicle.

Snowmobile 300 includes a snowmobile body 302, a seat 314 an endless track 316, shock absorber 317, and at least one ski 202. In operation, an engine (not shown), such as an electric or gas engine, supplies power to track 316, which propels snowmobile 300. Snowmobile 300 also includes a steering mechanism to control a direction of snowmobile 300 based on a position of skis 202, which are operatively connected to handlebar 304. In some embodiments, the skis 202 are coupled to a snowmobile chassis via suspension arms 204, 206 and spindle 102.

As shown in the examples of FIGS. 1A and 1B, snowmobile 300 includes a handlebar riser 320 that couples handlebar 304 to steering shaft 306. As described herein, in some embodiments, handlebar riser 320 includes first and second opposed components, each of which comprise a steering column mounting channel configured to receive a portion of the steering column, and a handlebar mounting channel configured to receive a portion of a handlebar. When the first and second opposed components are placed together and secured to one another, the respective steering column mounting channels form a first channel that surrounds a part of the steering column, and the respective handlebar mounting channels form a second channel that surrounds a part of the handlebar. The first and second components may each include a plurality of apertures, each configured to receive one or more fasteners (e.g., a bolt and corresponding nut). When coupled via the fasteners, a portion of the handlebar is at least partially surrounded by the first channel and is mechanically secured to the handlebar riser 320, and a portion of the steering shaft is at least partially surrounded by the second channel and is mechanically secured to handlebar riser 320.

In some examples, the respective handlebar mounting channels and steering column mounting channels of handlebar riser 320 may be described as tracks that, when the first and second opposed components of the handlebar riser 320 are secured together, form respective channels surrounding at least part of handlebar 304, and at least part of steering shaft 306.

In some examples, the first and second opposed components may be described as symmetrical to one another in the sense that each includes respective mating surfaces of substantially similar size and shape that, when put in contact and secured to one another, are reliably securable to a vehicle handlebar and steering column.

In some examples, the first and second opposed components may be described as substantially identical to one another. According to these examples, each of the respective components has an identical size, shape, and features.

Handlebar riser 320 as described herein provides significant advantages in comparison to typical handlebar riser used to couple a handlebar to a vehicle steering shaft. As described above, handlebar riser 320 is formed of opposed components which, in some embodiments, are symmetrical and formed with a molding or casting process, which may be simpler and with reduced cost in comparison to typical handlebar risers which are formed with an extrusion process.

In some examples, the respective components of the handlebar riser 320 may be substantially identical, formed by the same manufacturing process, and interchangeable with one another. In alternative embodiments, a portion or none of the two components are symmetrical or identical.

In some examples, forming handlebar riser 320 components by a casting or molding process may allow additional materials not suitable for extrusion to be used, such as polymers or different types of metals. As specific examples, handlebar riser 320 may be formed by injection or cavity molding, and made out of die cast aluminum or magnesium, or a polymeric-based material, including a composite such as fiberglass-filled nylon or carbon fiber-filled nylon.

In some examples, handlebar riser 320 is formed of a polymer. Such a polymer may include nylon, for example, Nylon 6/6 or Nylon 12. In other examples, such a polymer includes Polyethererketone (PEEK), Polypropylene (PP), and/or Polyphthalamide (PPA). In some examples, handlebar riser 320 may be formed of a hybrid composite of a polymer and other materials. For example, handlebar riser 320 may be formed of one or more of the above-described polymers containing glass and/or carbon fibers.

Figure 2:
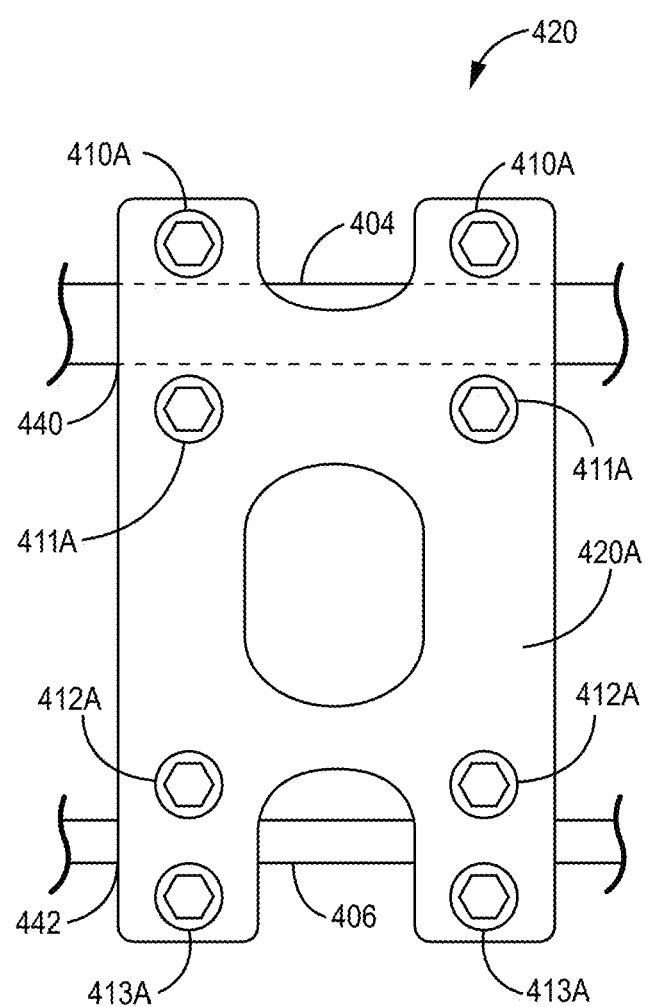
FIG. 2 is a front view of one example of a handlebar riser assembly, according to some embodiments.
Figure 3:
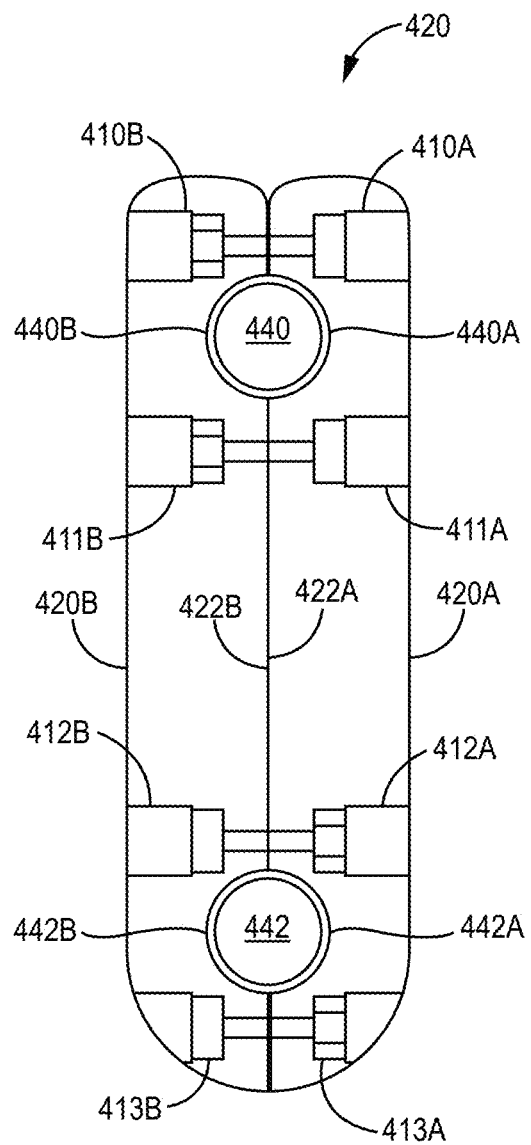
FIG. 3 is a side view of one example of a handlebar riser assembly, according to some embodiments.

FIGS. 2 and 3 are diagrams that illustrate respective front and side views of one example of a handlebar riser assembly 420 consistent with one or more aspects of this disclosure. As depicted in FIG. 2, handlebar assembly comprises a first component 420A and a second component 420B. In some embodiments, first component 420A and second component 420B are symmetric to one another. In another example, the first and second components 420A, 420B have one or more of corresponding features, interlocking features, and mating features. For example, each of first and second components 420A, 420B may be symmetric in the sense that each includes respective abutment surface 422A, 422B with a similar size and shape to one another.

In some examples, first component 420A may be substantially identical to second component 420B. According to these examples, first component 420A and second component 420B have an identical size and shape to the extent that they are interchangeable with one another. In some examples, where components 420A and 420B are identical, the components may be formed using the same manufacturing processes and techniques, thereby reducing complexity of manufacture and use of handlebar riser assembly 420.

As shown in FIGS. 2 and 3, first component 420A includes a first steering column mounting channel 442A, and a first handlebar mounting channel 440A. In some embodiments, first steering column mounting channel 442A and first handlebar mounting channel 440A are arranged perpendicular relative to abutment surface 422A of first component 420. First steering column mounting channel 442A is arranged at a lower section (closer to the ground) of abutment surface 422A, while first handlebar track 440A is arranged at an upper section of abutment surface 422A. As stated above, second component 420B may be symmetrical to first component 420A, and likewise includes a second steering column mounting channel 442B, and a second handlebar mounting channel 440B. Second steering column mounting channel 442B and second handlebar mounting channel 440B are arranged perpendicular relative to abutment surface 422B of second component 420B. As shown the example of FIGS. 2 and 3, second steering column mounting channel 442B is arranged at a lower section of abutment surface 422B, while second handlebar mounting channel 440B is arranged at an upper section of abutment surface 422B.

As described herein, first and second handlebar mounting channels 440A and 440B are configured to receive a handlebar in the sense that each is sized and shaped to correspond to substantially half of a circumference of a vehicle handlebar 404, such that when first and second components 420A and 420B are coupled to one another, a handlebar is securely coupled to handlebar riser 420. Likewise, first and second steering column mounting channels 442A and 442B are configured to receive vertical flanges of a steering column 406 in the sense that each is sized and shaped to correspond to substantially half of a diameter of the vertical flanges, such that when first and second components 420A and 420B are coupled to one another, the steering column is securely coupled to handlebar riser 420. Of course, one of ordinary skill in the art will understand that first and second handlebar mounting channels 440A and 440B and first and second steering column mounting channels 442A and 442B need not have a size and shape that corresponds exactly to a diameter of handlebar 404 or steering column 406 flanges, as a spacer or other fitting mechanism may be employed to improve the fit.

Figure 4:
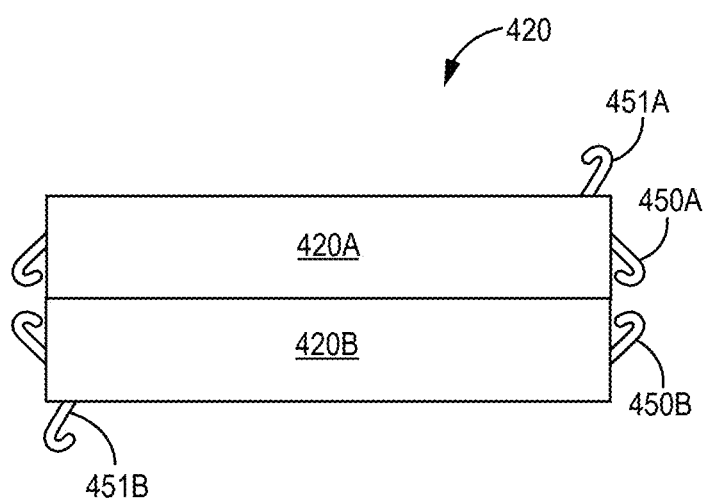
FIG. 4 is a side view of one example of a handlebar riser assembly, according to some embodiments.

As shown in FIGS. 2, 3 and 4, first component 420A and second component 420B are sized, shaped, and arranged so they when abutment surfaces 422A and 422B are placed in contact with one another, first handlebar mounting channel 440A and second handlebar mounting channel 440B form a first channel 440 that surrounds at least a part of handlebar 404, and first steering column mounting channel 440A and second steering column mounting channel 440B form a second channel 442 that surrounds at least part of horizontal flanges of steering column 406. As shown in the examples of FIG. 2, the respective first and second components 420A, 420B are mechanically coupleable to one another in a manner that secures handlebar 404 in first channel 440, and steering column 406 in second channel 442.

As shown in FIGS. 2 and 3, in some embodiments, first and second components 420A, 420B are coupled to one another using a fixation mechanism arranged at a surface perpendicular to an orientation of handlebar 404. In the example of handlebar riser assembly 420, first component 420A includes a plurality of apertures 410A-413A configured to receive such a coupling mechanism, and second component 420B includes a plurality of corresponding apertures 410B-413B similarly arranged. For example, the coupling mechanism may comprise a plurality of bolts insertable through apertures 410A-413A and 410B-413B and configured to be secured via a corresponding nuts arranged at apertures 410B-413B. In some embodiments, the apertures include a through hole and counterbore. In some embodiments, the recess (counterbore, if round) can be in the shape of a hex, etc. to correspond with the bolt head.

As depicted in FIG. 4, handlebar riser assembly 420 may include one or more routing members disposed on one or more exterior surfaces, which may be used to route electrical (e.g., signal or power carrying), mechanical, or fluid cables or hoses for controlling the vehicle (e.g., brakes, clutch, throttle etc. of a snowmobile) to handlebar 404. For example, as shown in FIG. 4, first component 420A includes a first routing member 451A arranged on exterior surface, and a second routing member 450A. Likewise, second component 420B includes a first routing member 451B, and a second routing member 450B. In the example of FIGS. 2, 3 and 4, riser assembly includes routing members 451A, 451B arranged near an edge of an exterior surface. In other examples not depicted in FIGS. 2, 3 and 4, handlebar riser assembly 420 may include exterior routing members 451A, 451B arranged close to a center of a rotational axis of riser assembly 420, in order to reduce an amount of cable or hose "take up" when turning handlebar coupled to handlebar riser assembly 420.

In some examples, such as shown in FIGS. 2, 3 and 4, respective routing members may be arranged such that when first component 420A and second component 420B are coupled together, respective routing members 450A, 450B combine to form a cable (or hose or wire) guide that substantially surrounds at least a portion one or more cables, wires, hoses, and additionally secure the cables or hoses. One or more cables (or hoses or wires) may be inserted between the respective routing members 450A, 450B before riser assembly 420 is mechanically coupled to handlebar 404 and steering column 406, and may be secured in place when riser assembly 420 is mechanically coupled to handlebar 404 and steering column 406.

Figure 5:
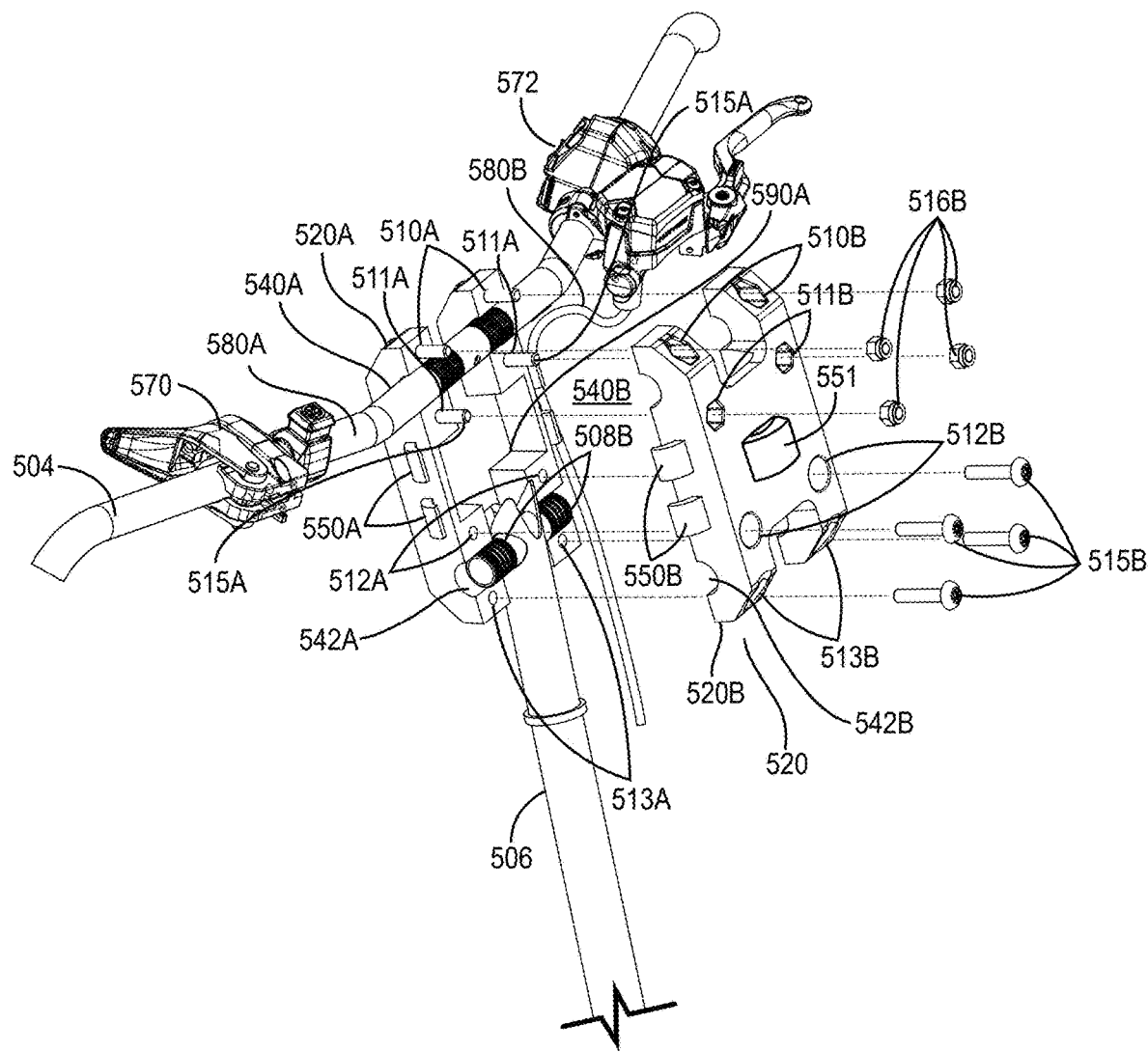
FIG. 5 is an exploded view of one example of a handlebar riser assembly, according to some embodiments.

FIG. 5 is an exploded view depicting components of a handlebar riser assembly 520. Handlebar assembly 520 is configured to couple a handlebar 504 of a vehicle, such as a snowmobile, to a steering column 506 of the vehicle. As shown in the example of FIG. 5, controls are mounted on handlebar 504, such as a brake control 572 and a throttle control 570. Brake control 572 may be coupled via one or more cables or hoses (e.g., hydraulic hose) 580A to one or more brake mechanisms of the vehicle, while throttle control 570 may be coupled via one or more cables (or hoses) 580B to a throttle of the vehicle's engine.

As shown in the example of FIG. 5, handlebar riser assembly 520 includes a first component 520A and a second component 520B. First component 520A includes a first handlebar mounting channel 540A configured to receive a part of handlebar 504, and a first steering column mounting channel 542A configured to receive flanges 508A, 508B of steering column 506.

As shown in FIG. 5, handlebar riser assembly 520 further includes a second component 520B. Second component 520B includes a second handlebar mounting channel 540B, and a second steering column mounting channel 542B that correspond to the first handlebar mounting channel 540A and first steering column mounting channel 542A of first component 520A.

Figure 6A:
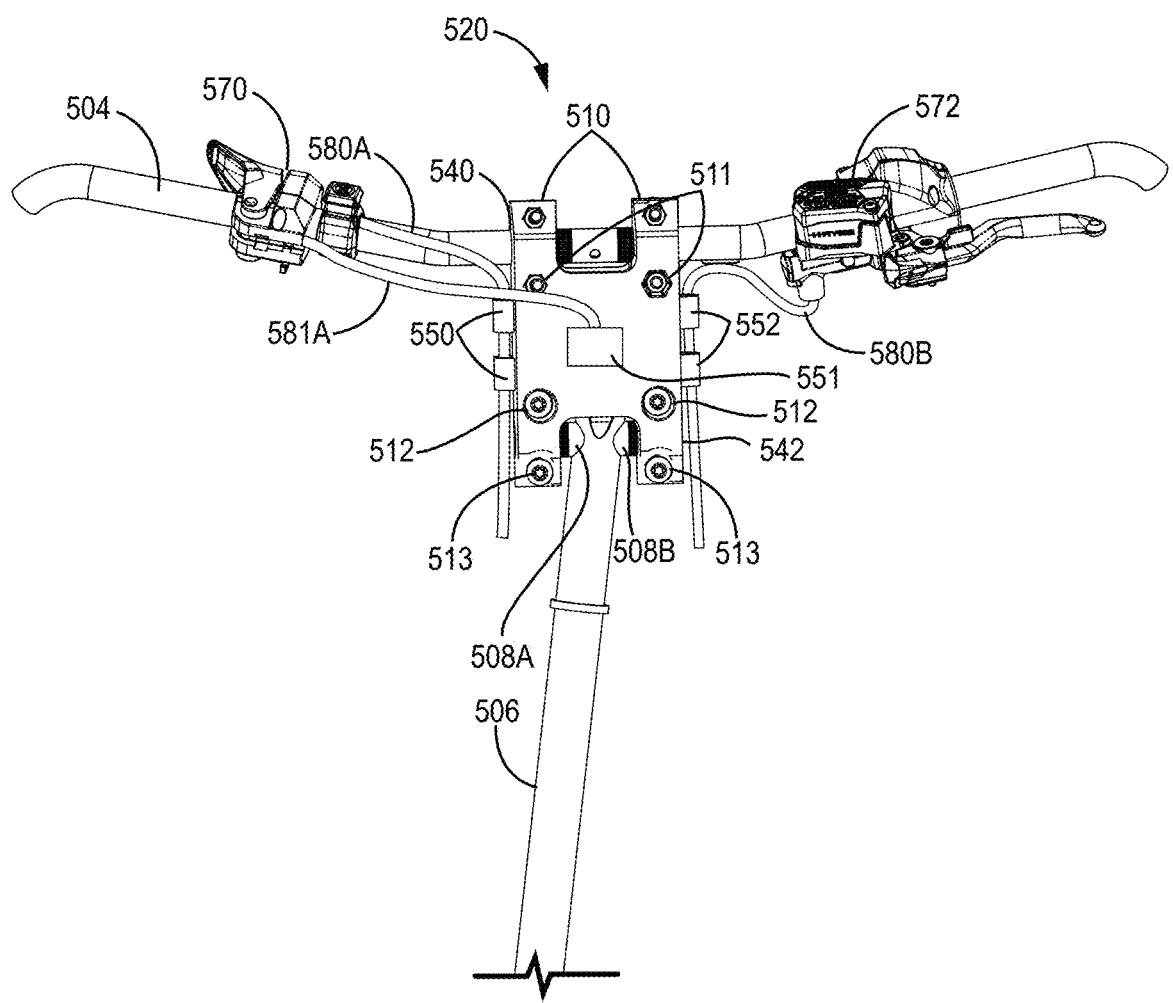
FIG. 6A is a front view of one example of a handlebar riser assembly arranged to couple a handlebar to a steering shaft, according to some embodiments.

First component 520A and second component 520B may be considered symmetrical in that first component 520A and second component 520B include opposed mating surfaces that are similarly sized, shaped, and arranged such that when placed together, the first and second steering column mounting channels 542A, 542B combine to form a steering column channel 542, and the first and second handlebar mounting channels 540A, 540B combine to form a handlebar channel 540 (see also FIG. 6A).

In some examples, first component 520A and second component 520B be may be substantially symmetrical to one another. For example, first component 520A and second component 520B may have an identical size, shape, and/or features to one another such that the components are interchangeable with one another. In one embodiment, the first and second component do not share symmetry across the plane where they interface, but rather share rotationally symmetry as a substantially identical component. Symmetry can be across a plane, such as a mirror image, but could also be symmetry of one component rotated 180° with respect to the other.

In some such examples, first and second components 520A and 520B are formed using the same manufacturing process, which may be a casting or molding process, in some examples. Using an casting or molding process to form respective first and second components 520A and 520B may offer significant advantages in comparison to typical handlebar risers, because a molding or casting process may be less complex and/or expensive compared to other manufacturing techniques such as extrusion which is commonly used to form a typical handlebar riser. In addition, using a casting or molding process to form handlebar riser 520 may allow colored materials to be used, which may eliminate a need to paint an exterior of the handlebar riser for cosmetic or other purposes, further reducing complexity and costs associated with manufacture of in comparison with typical handlebar risers.

In some examples, each of first component 520A and second component 520B may be considered symmetrical themselves, in that each of component may be identical and used interchangeably. Although identical, the components may join in only one direction, for example, in order to align fastener apertures. In another example, a first component 520A may include a first end and a second end, and when in a first position, the first end is used to couple the handlebar riser to a steering column, and a second end is used to couple the handlebar riser to a handlebar. According to this example, first component 520A may be flipped around to a second position, in which the first end is used to couple the handlebar riser to a handlebar, and the second end is used to couple the handlebar riser to a steering column.

In the example of FIG. 5, first component 520A and second component 520B each include a plurality of corresponding apertures configured to receive a coupling mechanism to couple first component 520A and second component 520B to one another. For example, as shown in FIG. 5, first component 520A includes apertures 510A-513A, which correspond to apertures 510B-513B of second component 520B in the sense that, when aligned, a coupling mechanism can be inserted through the respective apertures. For example, the coupling members may include a plurality of male and corresponding female portions, such as bolts 515A, and 515B, and corresponding female nuts 516A (not depicted in FIG. 5) and 516B.

In order to secure first component 520A and second component 520B together, bolts 515A are inserted through apertures 510B, 511B and apertures 510A, 511A, and corresponding nuts 516A are screwed onto each bolt. Accordingly bolts 515B are inserted through apertures 512B, 513B and apertures 512A, 513A, and corresponding nuts (not shown in FIG. 5) are screwed on to each bolt.

In some examples, one or more of respective apertures 510A-513A, 510B-513B are specifically sized and shaped to receive a particular coupling mechanism. For example, as shown in FIG. 5, apertures 510A-513A and 510B-513B each include a hexagonal shape sized to receive an associated female nut with a corresponding hexagonal shape and hold it in place.

As also shown in FIG. 5, each of first component 520A and second component 520B includes respective mounting portions 550A, 550B. In some examples, as depicted in FIG. 5, mounting portions 550A and 550B are arranged such that when first and second components 520A, 520B are coupled to one another, mounting members 550A, 550B form a cable guide that acts substantially surrounds and secures at least part of an electrical wire or mechanical actuation cable or hose 580A, 580B coupled to respective controls 570, 572 mounted on handlebar 504.

As shown in the example of FIG. 5, each of first component 520A and second component 520B include an interior depression 590A such that, when first and second components 520A and 520B are coupled to one another, handlebar riser assembly 520 includes an interior cavity. In some examples, such an interior cavity may be used, in addition to or instead of routing members 550A, 550B, to route cables, wires, or hoses to controls 570, 572 mounted on handlebar 504. In some example, cables or hoses may be routed through steering column 506, extend through the cavity of handlebar riser assembly 520, and to controls 570, 572. In other examples, where such cables are not routed through steering column 506, first component 520A and second component 520B may include one or more additional apertures to receive cables for purposes of routing them through the cavity.

According to the example of FIG. 5, handlebar riser assembly 520 includes first routing portions 550A and 550B, which are arranged to create a routing guide that surrounds at least a part of a cable, wire, or hose when the respective components 520A and 520B are secured to one another. As also shown in the example of FIG. 5, second component 520B includes an additional cable routing member 551 arranged at an exterior surface of second component 520B. In some examples, a combination of cable routing members 550A, 550B, and 551 may be used to rout respective cables and/or hoses from handlebar 504 to other components of a vehicle. In addition, although not depicted in FIG. 5, first component 520A may also include an additional routing member at an exterior surface similar to routing member 551 and configured to secure a cable or hose.

As described above, each of first and second components 520A, 520B may include an internal cavity (cavity 590A of component 520A is depicted in FIG. 5), that form an internal cavity when components 520A, and 520B are secured to one another. In some examples, such a cavity within handlebar riser assembly 520 may be filled with one or more materials to minimize vehicle vibrations felt by the operator. For example, the cavity of handlebar riser assembly 520 may be filled with a polymer, gel, or other filling configured to absorb vibrations so as to minimize the vibrations perceived by a vehicle rider when using handlebar 504.

Handlebar riser 520 as describe herein provides significant advantages in comparison to typical handlebar riser used to couple a handlebar to a vehicle steering shaft. As described above, handlebar riser 520 is formed of opposed components, which can be formed with a molding or casting process, which may be substantially simpler and with reduced cost in comparison to typical handlebar risers which are formed with an extrusion process as described above. In some examples, because the respective components of handlebar riser 520 may be formed of a casting or molding process, additional materials such as polymers or plastics or metals (e.g., die cast aluminum or magnesium) may be used to form handlebar riser assembly 520, which would not be possible for a typical handlebar riser manufactured using an extrusion process. As specific examples, handlebar riser 520 may be formed by injection or cavity molding, and made out of die cast aluminum or magnesium, or a polymeric-based material, including a composite such as fiberglass-filled nylon or carbon fiber-filled nylon.

In addition, as shown in FIG. 5, bolts 515A, 515B are used to secure respective first and second riser components 520A, 520B together horizontally, which may allow for easier access in comparison to typical handlebar risers that use bolts arranged vertically.

FIGS. 6A-6D depict various perspective views of one example of an assembled handlebar riser 520. As depicted in FIGS. 6A-6D, first component 520A and second component 520B have been arranged such that a part of handlebar 504 is within handlebar channel 540. Likewise, at least a portion of horizontal flanges 508A, 508B of steering column 506 are arranged within steering column channel 542.

Figure 6B:
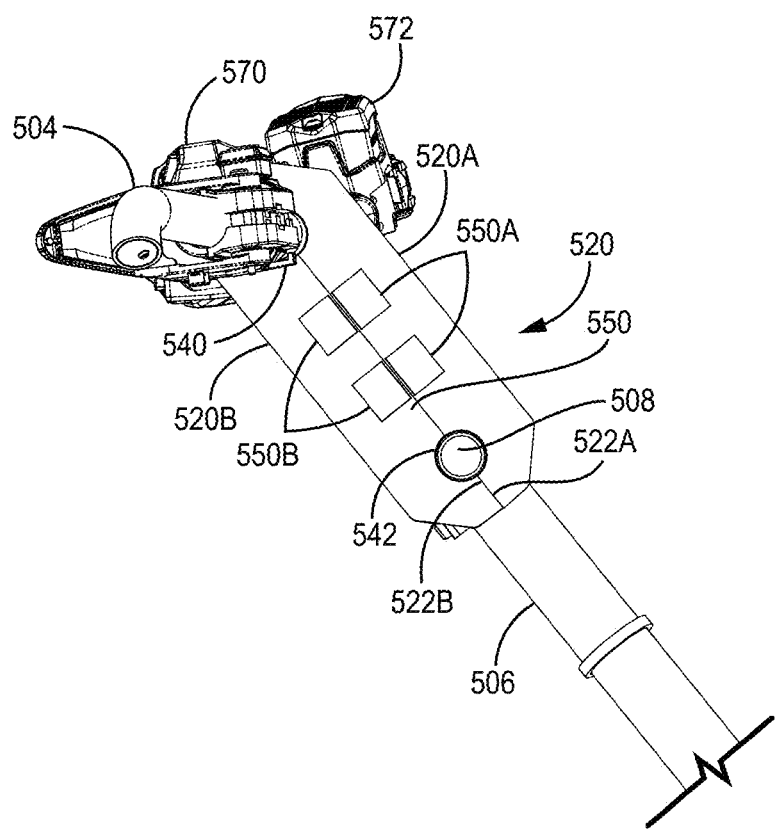
FIG. 6B is a side view of one example of a handlebar riser assembly arranged to couple a handlebar to a steering shaft, according to some embodiments.
Figure 6C:
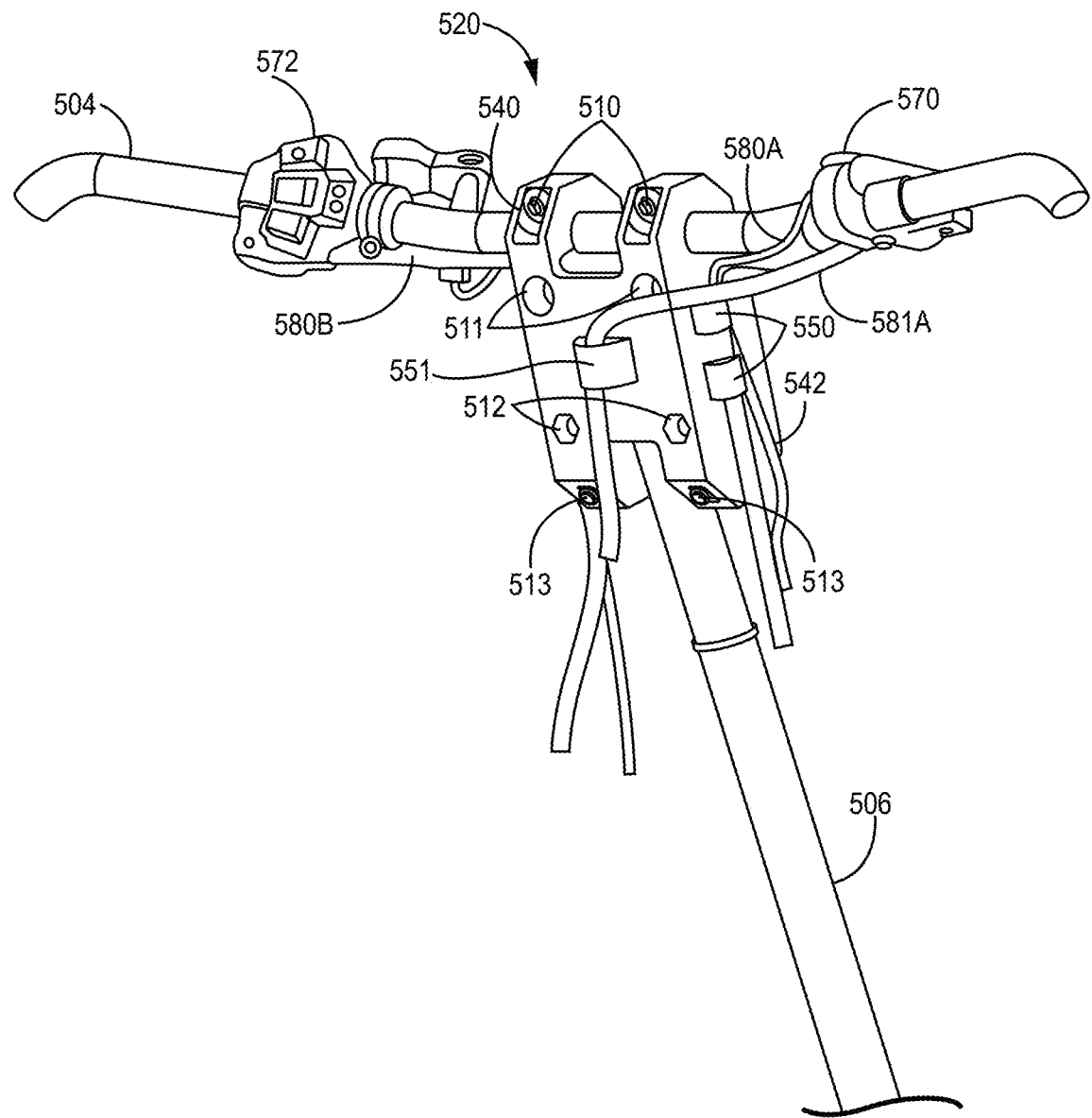
FIG. 6C is a rear view of one example of a handlebar riser assembly arranged to couple a handlebar to a steering shaft, according to some embodiments.
Figure 6D:
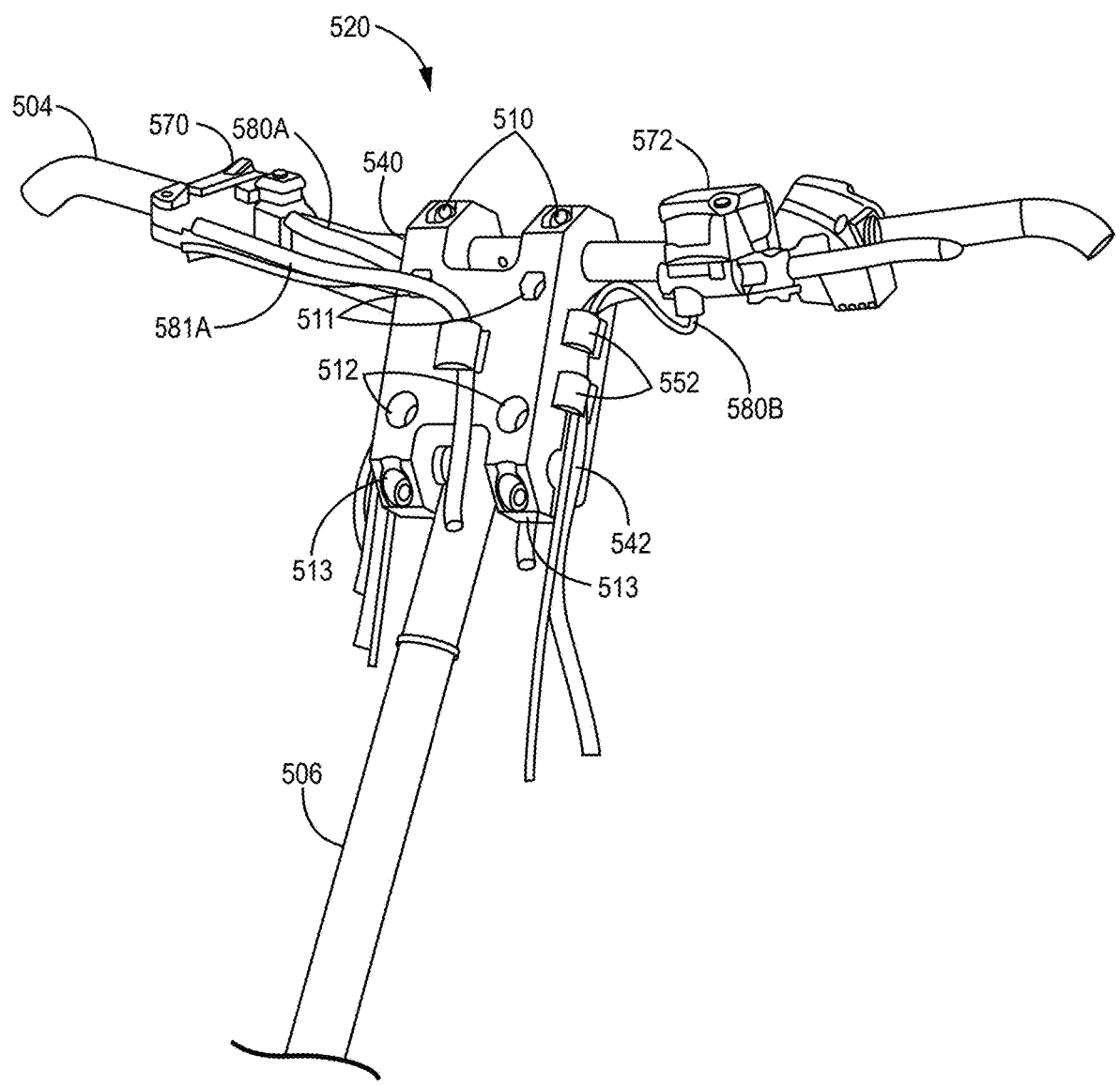
FIG. 6D is a front view of one example of a handlebar riser assembly arranged to couple a handlebar to a steering shaft, according to some embodiments.

As shown in FIGS. 6A and 6B, first component 520A and second component 520B are secured to one another via mechanical coupling through apertures 510A-513A in first component 520A and corresponding apertures 510B-513B in second component 520B. In the example of FIGS. 6A and 6B, the coupling members comprise corresponding male portions (bolts) inserted through apertures 510A-513A, 510B-513B and corresponding female portions (nuts) figured to screw onto the male portions and thereby securing first component 520A to second component 520B, and thereby securing riser assembly 520 to both handlebar 504 and steering column 506.

As shown in the example of FIGS. 6A-6D, controls are mounted on handlebar 504, for example brake control 572 and throttle control 570. Brake control 572 is coupled to other components of a vehicle via one or more hoses or cables 580B, while throttle control 570 is coupled to other components of the vehicle via cables or hoses 580A and 581A. According to the depicted example, cables or hoses 580B associated with brake control 572 are routed elsewhere through cable routing guide 552. As also depicted, a first cable or hose 580A associated with throttle control 570 is routed through cable routing guide 550, while a second cable or hose 581A is routed elsewhere through additional routing member 551.

Figure 7:
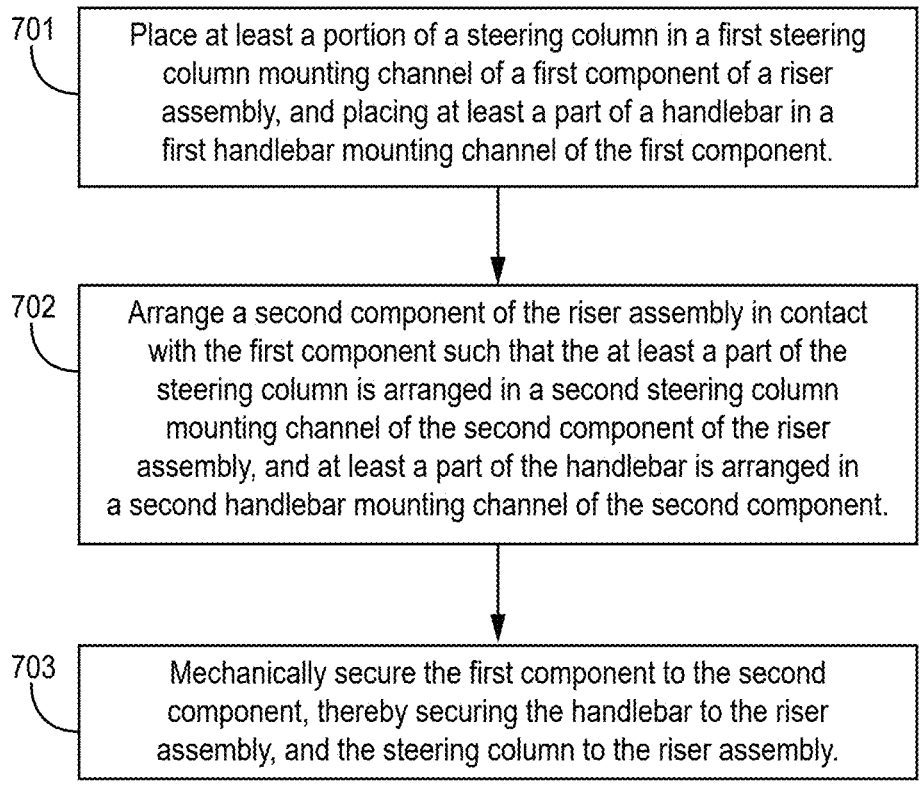
FIG. 7 is a flow diagram depicting one example of a method of coupling a vehicle steering column to a vehicle handlebar using a handlebar riser assembly, according to some embodiments.

FIG. 7 is a flow diagram depicting one example of a method of coupling a vehicle steering column to a vehicle handlebar using a handlebar riser assembly consistent with one or more aspects of this disclosure. As depicted in FIG. 7, at 701, the method includes placing at least a part of a steering column (506) (e.g., steering column flanges 508A, 508B) in a first steering column mounting channel (542A) of a first component (520A) of the riser assembly (520), and placing at least a part of a handlebar (504) in a first handlebar mounting channel (540A) of the first component (520A). As also depicted in FIG. 7, at 702, the method further includes arranging a second component (520B) of the riser assembly 520 in contact with the first component 520A such that the at least a part of the steering column 506 is arranged in a second steering column mounting channel (542B) of the second component (520B) of the riser assembly (520), and at least a part of the handlebar is arranged in a second handlebar mounting channel (540B) of the second component (520B). The first and second steering column mounting channels form a steering column channel (542) that receives the steering column and substantially surrounds at least part of the steering column (such as flanges). The first and second handlebar mounting channels form a handlebar channel (540) that receives the handlebar and substantially surrounds at least part of the handlebar.

As also depicted in FIG. 7, at 703, the method includes mechanically securing the first component (520A) to the second component (520B), thereby securing the handlebar (504) to the riser assembly (520), and the steering column (506) to the riser assembly (520). In some examples, mechanically securing the first component (520A) to the second component (520B) comprises mechanically coupling the first component and the second component together based on a coupling mechanism inserted into apertures formed in a surface of the first component and a surface of the second component. In some examples, the coupling mechanism comprises a male portion comprising a plurality of bolts, and a female portion comprising a plurality of nuts. According to these examples, a bolt is inserted through each aperture in the surfaces of the first and second portions, and secured by screwing a corresponding nut onto each respective bolt.

Figure 8A:
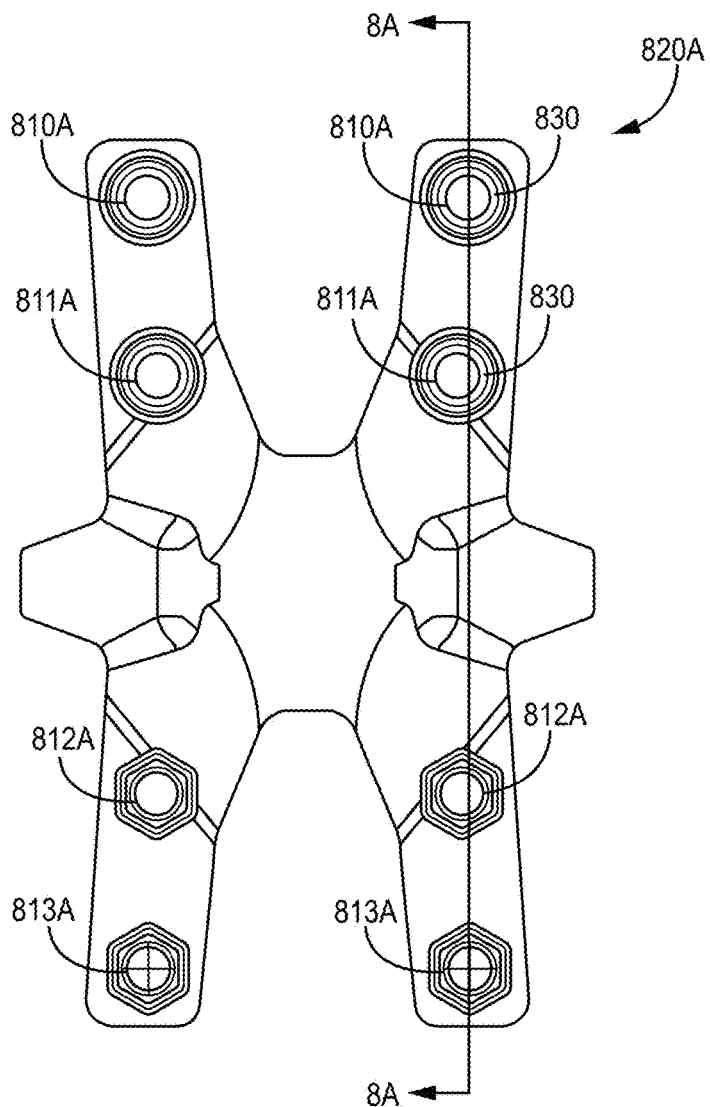
FIG. 8A is a front view of one example of a portion of a handlebar riser assembly, according to some embodiments.
Figure 8B:
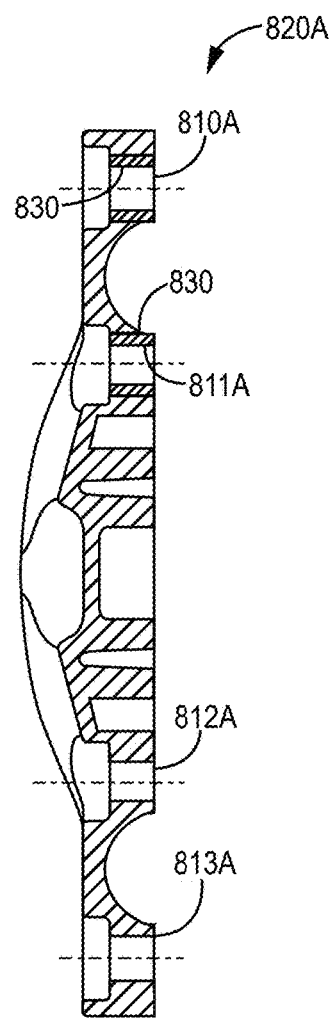
FIG. 8B is a cross-sectional view along line 8A of the portion of FIG. 8A.

Turning to FIGS. 8A and 8B, FIG. 8A shows an embodiment of a portion of a handlebar riser assembly and FIG. 8B shows a cross-section the embodiment of FIG. 8A. In some embodiments, a first component 820A includes a plurality of apertures, such as 810A-813A. In some embodiments, an insert 830 is disposed in a portion of the component 820A to form one or more of the apertures. As shown, in some embodiments, the insert 830 is cylindrical and may be made of brass, stainless steel, or other suitable material. In some embodiments, the insert 830 is utilized to provide crush resistance as the riser assembly halves are affixed to one another. In this way, the insert 830 may be formed from a material that is less susceptible to crushing than the surrounding or adjacent portion of the first component 820A. In some embodiments, apertures 810A and 811A are formed via the inserts 830, though any suitable combination and number of the apertures can have the inserts 830. The inserts 830 can be molded into the component 820A, over-molded, pressed-in, adhered to the component 820A, or attached or held in place by any suitable method. A In some embodiments, the insert 830 is a bushing or sleeve. In some embodiments, the insert 830 has internal threads for adjacent halves of the handlebar riser assembly together, for example via a threaded fastener. In some embodiments, smooth-bore (non-threaded) inserts are be located at 810A and 811A, while threaded inserts are located at 812A and 813A. In this way, the second component (820B—not shown) is identical to the first component 820A. When the two components 820A and 820B are assembled together and they are lying in the same orientation, one of them is flipped in facing relation and then rotated 180 degrees relative to the other. Thereafter, fasteners can be inserted through 810A and 811A and threaded into 812B and 813B (on the adjacent component). Similarly, fasteners can be inserted through 810B and 811B and threaded into 812A and 813A. Other suitable arrangements can be utilized—for example threaded studs can be molded into the part or otherwise attached to it and nuts or other retainers can be used to secure the halves together and on the steering column and handlebar (not shown in FIGS. 8A and 8B).

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A handlebar riser for use in a vehicle, comprising:
   a first component comprising a first steering column mounting channel for receiving at least a part of a steering column coupled to the vehicle, and a first handlebar mounting channel for receiving at least part of a handlebar of the vehicle;
   a second component identical to the first component, the second component comprising a second steering column mounting channel corresponding to the first steering column mounting channel of the first component and a second handlebar mounting channel corresponding to the first handlebar mounting channel;
   wherein the first component and the second component are sized, shaped and arranged such that when an abutment surface of the first component and an abutment surface of the second component are placed in alignment with one another, the first and second steering column mounting channels form a first channel surrounding at least part of the steering column, and the first handlebar mounting channel and the second handlebar mounting channel form a second channel surrounding at least part of the handlebar, such that when the first component and the second component are mechanically coupled together, the handlebar is secured to the handlebar riser and the steering column is secured to the handlebar riser so that the vehicle is steerable using the handlebar.

2. The handlebar riser of claim 1, further comprising:
   a plurality of male fixation members and a plurality of female fixation members configured to interface with the plurality of male fixation members through apertures of the first component and apertures of the second component to secure the first component and the second component to one another.

3. The handlebar riser of claim 2, wherein the plurality of male fixation members comprise a plurality of bolts, and wherein the plurality of female fixation members comprises a plurality of nuts configured to be secured to the plurality of bolts.

4. The handlebar riser of claim 1, wherein the first component is interchangeable with the second component.

5. The handlebar riser of claim 1, wherein the first component comprises a first cable guide portion and the second component comprises a second cable guide portion, and wherein the first and second cable guide portions are arranged such that when the first and second components are coupled together, the first and second cable guide portions form a cable guide configured to substantially surround a part of at least one cable or hose.

6. The handlebar riser of claim 1, wherein the first component and the second component are formed by using the same process.

7. The handlebar riser of claim 1, wherein the first component and the second component are formed of one or more of die cast aluminum, die cast magnesium, fiberglass-filled nylon, carbon fiber-filled nylon, and a polymer including glass or carbon fibers.

8. The handlebar riser of claim 1, wherein the first component and the second component are formed of one or more of Nylon 6/6, Nylon 12, Polyethererketone (PEEK), Polypropylene (PP), and Polyphthalamide (PPA).

9. A handlebar riser assembly, comprising:
   a first component comprising a first steering column mounting channel for receiving at least part of a steering column and a first handlebar mounting channel for receiving at least part of a handlebar;
   a second component identical to the first component comprising a second steering column mounting channel for receiving the at least part of the steering column and a second handlebar mounting channel for receiving the at least part of the handlebar; and
   wherein the first component and the second component are sized, shaped and arranged such that when an abutment surface of the first component and an abutment surface of the second component are placed in alignment with one another, the first and second steering column mounting channels form a first channel surrounding at least part of the steering column, and the first and second handlebar mounting channels form a second channel surrounding at least part of the handlebar, such that when the first component and the second component are mechanically coupled together, the handlebar is secured to the handlebar riser assembly and the steering column is secured to the handlebar riser so that a vehicle comprising the handlebar riser assembly is steerable using the handlebar.

10. A method of coupling a steering column to a handlebar using a riser assembly, comprising:
    placing at least a part of the steering column in a first steering column mounting channel of a first component of the riser assembly, and placing at least a part of the handlebar in a first handlebar mounting channel of the first component;
    arranging a second component of the riser assembly substantially identical to the first component of the riser assembly in contact with the first component of the riser assembly such that the at least a part of the steering column is arranged in a second steering column mounting channel of the second component of the riser assembly, and at least a part of the handlebar is arranged in a second handlebar mounting channel of the second component; and
    mechanically securing the first component to the second component, thereby securing the handlebar to the riser assembly, and the steering column to the riser assembly.

11. The method of claim 10, wherein mechanically securing the first component to the second component comprises mechanically securing the part of the steering column in the first steering column mounting channel and in the second steering mounting channel in a first channel formed by the first steering column mounting channel and the second steering column mounting channel, and mechanically securing the part of the handlebar in the first handlebar mounting channel and in the second handlebar channel in a second channel formed by the first handlebar mounting channel and the second handlebar mounting channel.

12. The method of claim 10, wherein mechanically securing the first component to the second component comprises:
  inserting a plurality of male fixation members through apertures of the first component and apertures of the second component; and
  coupling a plurality of female fixation members to the plurality of male fixation members to secure the first component and the second component to one another.

13. The method of claim 12, wherein the plurality of male fixation members comprise a plurality of bolts, and wherein the plurality of female fixation members comprises a plurality of nuts configured to be secured to the plurality of bolts.

14. The method of claim 10, wherein the first component is identical to the second component.

15. The method of claim 10, wherein the first component is interchangeable with the second component.

16. The method of claim 10, wherein the first component comprises a first cable guide portion and the second component comprises a second cable guide portion, wherein mechanically securing the first component to the second component comprises:
  substantially surrounding at least portion of a cable, wire, or hose by a cable guide formed of the first cable guide portion and the second cable guide portion.

17. The method of claim 10, further comprising:
  forming the first component and the second component of one or more of die cast aluminum, die cast magnesium, fiberglass-filled nylon, carbon fiber-filled nylon, and a polymer including glass or carbon fibers.

18. The method of claim 10, further comprising:
  forming the first component and the second component of one or more of Nylon 6/6, Nylon 12, Polyethererketone (PEEK), Polypropylene (PP), and Polyphthalamide (PPA).

* * * * *